(12) United States Patent
Cronin et al.

(10) Patent No.: US 10,401,943 B2
(45) Date of Patent: Sep. 3, 2019

(54) SMART PLURALITY OF SENSORS FOR POWER MANAGEMENT

(71) Applicant: KONINKLIJKE PHILIPS N.V., Eindhoven (NL)

(72) Inventors: John Cronin, Bonita Springs, FL (US); Seth Cronin, Bonita Springs, FL (US); Steven Philbin, Williston, VT (US); Roger Holmes, Son en Breugel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 151 days.

(21) Appl. No.: 15/559,444

(22) PCT Filed: Mar. 22, 2016

(86) PCT No.: PCT/EP2016/056296
§ 371 (c)(1),
(2) Date: Sep. 19, 2017

(87) PCT Pub. No.: WO2016/150981
PCT Pub. Date: Sep. 29, 2016

(65) Prior Publication Data
US 2018/0074571 A1   Mar. 15, 2018

Related U.S. Application Data

(60) Provisional application No. 62/137,188, filed on Mar. 23, 2015.

(30) Foreign Application Priority Data

Aug. 5, 2015 (EP) .................................. 15179777

(51) Int. Cl.
*G06F 1/32* (2019.01)
*G06F 1/16* (2006.01)
(Continued)

(52) U.S. Cl.
CPC ............ *G06F 1/3287* (2013.01); *G06F 1/163* (2013.01); *G06F 1/325* (2013.01); *G06F 1/3206* (2013.01);
(Continued)

(58) Field of Classification Search
CPC ...... G06F 1/3287; G06F 1/3206; G06F 1/325; G06F 1/163; H04W 52/0254
See application file for complete search history.

(56) References Cited

U.S. PATENT DOCUMENTS 9,549,374 B2 * 1/2017 Lim .................. H04W 52/0258
9,620,000 B2 * 4/2017 Wang .................... G08C 17/00
(Continued)

FOREIGN PATENT DOCUMENTS

WO   WO2011020060 A2   2/2011

OTHER PUBLICATIONS

PCT International Search Report, International Application No. PCT/EP2016/056296, dated Mar. 22, 2016.

*Primary Examiner* — Stefan Stoynov

(57) ABSTRACT

The present disclosure provides devices, systems and methods directed towards smart plurality of sensors for power management. More specifically, the present disclosure provides devices, systems and methods that can reduce the amount of power consumed by the plurality of sensors by evaluating when sensors should be activated or deactivated. By reducing the amount of time a particular sensor is actively polling for information, power consumed by the plurality of sensors associated with the wearable device can be reduced.

15 Claims, 13 Drawing Sheets

(51) Int. Cl.
*H04W 52/02* (2009.01)
*G06F 1/3287* (2019.01)
*G06F 1/3206* (2019.01)
*G06F 1/3234* (2019.01)
*H04W 84/18* (2009.01)
*H04B 1/3827* (2015.01)

(52) U.S. Cl.
CPC ....... *H04W 52/0254* (2013.01); *G06F 1/1643* (2013.01); *H04B 1/385* (2013.01); *H04W 52/0277* (2013.01); *H04W 84/18* (2013.01); *Y02D 10/171* (2018.01); *Y02D 70/00* (2018.01); *Y02D 70/1224* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/26* (2018.01)

(56) References Cited

U.S. PATENT DOCUMENTS

| | | |
|---|---|---|
| 9,769,755 B2* | 9/2017 | Uchiyama ................ H04Q 9/00 |
| 2013/0047005 A1 | 2/2013 | Lee |
| 2014/0125618 A1 | 5/2014 | Panther |
| 2015/0092520 A1 | 4/2015 | Robison |

* cited by examiner

Smart Plurality of Sensors for Power Management

Settings GUI on Wearable Device

Settings

| Select Health Sensor Usage | Sensor Profile Data | Dependent | Conditions | | |
|---|---|---|---|---|---|
| Activity Sensor | 1% Battery life per hour | Time ▽ | Always On ▽ | From 6am – 10pm ▽ | |
| HR Sensor | 10% Battery life per hour | Data ▽ | On When ▽ | Activity ▽ | Increases 20% |
| BP Sensor | 12% Battery life per hour | Data ▽ | On When ▽ | HR ▽ | >130 BPM |
| Temp Sensor | 8% Battery life per hour | Time ▽ | Sample ▽ | Once every hour | |

[ Save Settings ]

FIGURE 4

Smart Plurality of Sensors for Power Management

Sensor Profile Database on Wearable Device

| Sensor Type | Model # | Typical Setting | Battery consumption per hour (% of 300 mAh) |
|---|---|---|---|
| Activity | Accelo-3038 | Time Dependent | 1% |
| Activity | accelerometerp11 | Time Dependent | 1.80% |
| Heart Rate | H7 | Data dependent | 10% |
| Blood pressure | BP7 | Data Dependent | 12% |
| Temperature | Thermo-11 | Time Dependent | 8% |
| UV Exposure | Photo-LDR | Time Dependent | 2% |
| Hydration | MicroFluidic1 | Data Dependent | 15% |
| Steps | Pedometer11 | Time Dependent | 1% |

FIGURE 11

SMART PLURALITY OF SENSORS FOR POWER MANAGEMENT

CROSS-REFERENCE TO RELATED APPLICATIONS

The present application claims the priority benefit under 35 U S C. § 371 of International Patent Application No. PCT/EP2016/056296, filed Mar. 22, 2016, which claims the benefit of European Patent Application No. EP15179777.6, filed on Aug. 5, 2015, and claims the priority benefit of U.S. provisional application No. 62/137,188 filed Mar. 23, 2015 and entitled "Smart Plurality of Sensors for Power Management,". These applications are hereby incorporated by reference herein in their entirety.

BACKGROUND

Field of Invention

The present invention generally relates to wearable technology. More specifically, the present invention relates to smart plurality of sensors for power management.

Description of the Related Art

Wearable technology may include any type of mobile electronic device that can be worn on the body, attached to or embedded in clothes and accessories of an individual and currently exists in the consumer marketplace. Processors and sensors associated with the wearable technology can display, process or gather information. Such wearable technology has been used in a variety of areas, including monitoring health data of the user as well as other types of data and statistics. These types of devices may be readily available to the public and may be easily purchased by consumers. Examples of some wearable technology in the health arena include Fit Bit, Nike Fuel Band, and the Apple Watch.

As noted above, a wearable device may include one or more sensors used to measure various types of parameters. Each sensor, associated with the wearable device, may have different characteristics or behaviors compared to other sensors associated with the same wearable device. For example, each sensor may have their own power requirements or their own instructions for when (e.g., time-based or condition-based) the sensors are operational to obtain sensor data. In any case, a wearable device having a plurality of sensors can pose a problem since the sensors themselves may constantly consume power while they are on and/or while in the process of obtaining sensor data. The constant power drain may dramatically reduce the battery life of the wearable device.

There is need for a power management system that can manage the operations of each of the plurality of sensors for the purpose of minimizing power consumption. In this way, the wearable device may be operational for longer periods of time on a single battery charge.

SUMMARY

Embodiments of the present disclosure may include systems and methods directed towards smart plurality of sensors for power management.

In some implementations, a method for power management of a wearable device is described. Such a method may include receiving one or more power management settings from a user. Such settings may be used to manage operation of the sensors associated with the wearable device. An evaluation may be performed as to whether or not each sensor should be activated or deactivated based on the power management settings. Each of the sensors may then be activated or deactivated based on the evaluation. For each sensor that was activated, the wearable device may instruct the respective sensor to obtain sensor data. For each sensor that was deactivated, the wearable device may obtain information describing a duration of time the sensor was active. An analysis of power consumption may be generated for each sensor associated with the wearable device. Such analysis of power consumption for each sensor may be based on characteristics of each sensor along with the duration of time the sensor was active. The analysis also may be displayed to the user.

In some implementations, a wearable device that manages power for a corresponding plurality of sensors is described. The wearable device may include a processor that executes instructions stored in memory. The instructions may direct the wearable device to receive user input pertaining to one or more power management settings that are used to manage operation of the sensors associated with the wearable device, to evaluate whether each of the sensors should be activated or deactivated based on the power management settings, and to activate or deactivate each of the sensors based on the evaluation. For each sensor that was activated, the wearable device may instruct the sensor to obtain sensor data. For each sensor that was deactivated, the wearable device may obtain information describing a duration of time the sensor was active. The wearable device can then generate an analysis of power consumption for each sensor associated with the wearable device. The analysis may be displayed for the user to view. The analysis of power consumption for each sensor may be based on characteristics of each sensor along with the duration of time the sensor was active.

In some implementations, a method for power management in a wearable device is provided that includes: receiving input from a user via a user interface, the user input regarding one or more power management settings to be stored in the wearable device and used to manage operation of a plurality of sensors associated with the wearable device; determining an updated status for each of the sensors based on the power management settings, wherein the status pertains to whether the sensor should be activated or deactivated; updating a state of each sensor based on the determined updated status of the sensor; obtaining sensor data for each activated sensor; obtaining a duration for each sensor that was deactivated following the updating step; storing the sensor data and the duration into memory; generating, for each sensor, an analysis of power consumption; and displaying the analysis on the wearable device for the user to view.

These and/or other implementations of the technology disclosed herein may optionally include one or more of the following features.

In some implementations, the power management settings include time-based conditions and data-based conditions. In other implementations, the power management settings include location-based conditions, and further comprising evaluating a location of the user using GPS.

In some embodiments, the method may further include before updating a state of each sensor: determining the power level of a power supply; determining whether a secondary sensor from another device is available for polling and, if the secondary sensor is available, polling the secondary sensor.

In some implementations, the plurality of sensors include one or more sensors including at least one of activity sensors, temperature sensors, blood pressure sensors, heart rate sensors, ultraviolet (UV) exposure sensor, hydration sensor, and/and pedometer. In other implementations, the displayed analysis on the wearable device includes a current prediction of the life-span of the wearable device given a current amount of remaining power available. Still other implementations may include updating the state of each sensor includes activating or deactivating the sensor.

Generally, in another aspect, a wearable device having smart plurality of sensors for power management is described wherein the wearable device comprises: a plurality of sensors; a user interface that receives input from a user regarding one or more power management settings to be stored in the wearable device and used to manage operation of the plurality of sensors; a processor that executes instructions stored in memory, wherein execution of the instructions by the processor: determines an updated status for each of the sensors based on the power management settings, wherein the status pertains to whether the sensor should be activated or deactivated, updates a state of each sensor based on the determined updated status of the sensor, obtains sensor data for each activated sensor, obtains a duration for each sensor that was deactivated following the updating step, and generates, for each sensor, an analysis of power consumption; memory that stores the sensor data and the duration; and a display screen that displays the analysis for the user to view.

These and/or other implementations of the technology disclosed herein may optionally include one or more of the following features.

In some implementations, the power management settings include time-based conditions and data-based conditions. The power management settings may further include location-based conditions, and further comprising global positioning system (GPS) components for utilizing GPS to determine and/or evaluate a location of the user.

In some variations, the plurality of sensors may include one or more sensors including one of an activity sensors, temperature sensors, blood pressure sensors, heart rate sensors, ultraviolet (UV) exposure sensor, hydration sensor, and/or pedometer.

Alternatively, the displayed analysis may include a current prediction of the life-span of the wearable device given a current amount of remaining power available. Still further, the technology may implement updating the state of each sensor includes activating or deactivating the sensor.

Still further implementations may include a non-transitory computer-readable storage medium, having embodied thereon a program executable by a processor to perform a method for power management in a wearable device comprising: receiving input from a user via a user interface, the user input regarding one or more power management settings to be stored in the wearable device and used to manage operation of a plurality of sensors associated with the wearable device; determining an updated status for each of the sensors based on the power management settings, wherein the status pertains to whether the sensor should be activated or deactivated; updating a state of each sensor based on the determined updated status of the sensor; obtaining sensor data for each activated sensor; obtaining a duration for each sensor that was deactivated following the updating step; storing the sensor data and the duration into memory; generating, for each sensor, an analysis of power consumption; and displaying the analysis on the wearable device for the user to view.

Techniques, methods and apparatus described herein may give rise to a variety of technical advantages. For example, the smart plurality of sensors for power management may effectively extend the battery life of the wearable device by intelligent activation or disabling of sensors on the device. By inclusion of time, data and location based conditions, power control settings may be defined by the user to selectively activate and disable various sensors on the wearable device to increase battery life. Furthermore, advantages include allowing the user to define and selectively determine energy savings form a sensor profile listing and selectively be able to intelligently control activation and disabling of such sensors. in order to increase battery charge.

Other implementations may include a non-transitory computer readable storage medium storing instructions executable by a processor (e.g., a central processing unit (CPU) or graphics processing unit (GPU)) to perform a method such as one or more of the methods described above. Yet another implementation may include a system of one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates an example electronic display for settings GUI.

FIG. 11 illustrates an example of a sensor profile database.

DETAILED DESCRIPTION

Embodiments of the various disclosures herein provide a wearable device that includes a smart plurality of sensors for power management. The wearable device is able to detect and evaluate circumstances dictating when one or more the smart plurality of sensors should be in use. By managing the operation of the smart plurality of sensors, the consumption of power from the smart plurality of sensors can be controlled. Therefore, the overall consumption of power from the smart plurality of sensors on the wearable device can be reduced.

Reference in the specification to "one embodiment" or "an embodiment" or an implementation or various aspects means that a particular feature, structure, or characteristic described in conjunction with the embodiment can be included in at least one embodiment of the disclosure. The appearances of the phrase "in one embodiment" and the like in various places does not necessarily refer to the same embodiment.

Implementations and embodiments disclosed herein relate to a smart plurality of sensors for power management wherein power management settings for the device may allow for reduction in the number of sensors active and thus reduce the loading of the battery at any given time. Various embodiments set forth reduce the amount of power consumed by the plurality of sensors by evaluating when sensors should be activated or deactivated. By reducing the amount of time a particular sensor is actively polling for information, power consumed by the plurality of sensors associated with the wearable device can be reduced.

Figure 1:
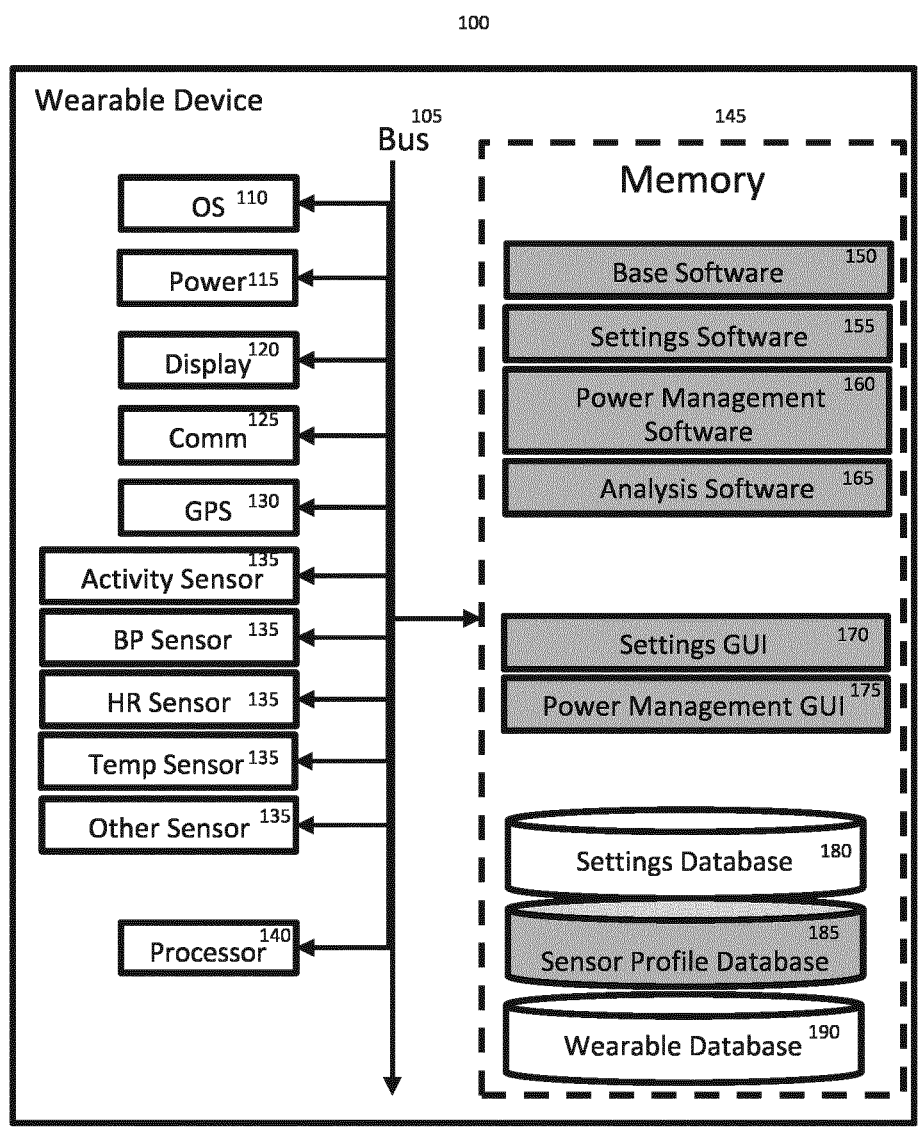
FIG. 1 illustrates an example architecture for a wearable device that includes a smart plurality of sensors for power management.

FIG. 1 illustrates a wearable device 100 that includes a smart plurality of sensors for power management. The wearable device 100 may include a variety of different elements. These elements may include a central bus 105, an operating system (OS) 110, a power supply 115, a display 120, a communication module 125, global position system (GPS) 130, a plurality of sensors 130, a processor 130 and memory 135. Further details regarding the various elements are provided below.

The central bus 105 may be used to connect the various elements within the wearable device 100. More specifically, the central bus 105 may be used to transfer data between the various elements of the wearable device 100. The central bus 105 may also include related hardware components (e.g., wire, optical fiber) and software (e.g., communication protocols).

The OS 110 is software that can be used to manage the various elements and resources associated with the wearable device 100. For example, various different operating systems 110 such as Darwin, RTXC, LINUX, UNIX, OS X, ANDROID, WINDOWS, or an embedded operating system such as VxWorks, may be incorporated for use with the wearable device 100.

The power supply 115 may be included with the wearable device 100 to provide power for the operation of the wearable device 100. The power supply 115 may be implemented through the use of a capacitor or a battery (e.g., rechargeable lithium battery). The power supply 115 may also be capable of being charged or re-charged using an external power source (e.g., battery charger).

The wearable device 100 may also include a display 120. The display 120 may be used by the wearable device 100 to display various types of information or facilitate interaction between the user and the wearable device 100 (e.g., graphical user interface). In some embodiments, the display 120 may also be a touch screen display that allows the user to directly with the wearable device 100 through physical contact with the display 120. In other embodiments, the display 120 may also be a liquid-crystal display (LCD) or an e-ink type display.

The communication module 125 may facilitate communication (e.g., wireless communication) between the wearable device 100 and other devices (e.g., wearable devices, smart devices) and/or networks. The communication module 125 may implement the communication through the use of one or more methods known in the art including Wi-Fi, Bluetooth, 3G, 4G, LTE, near field communication (NFC).

The GPS element 130 may be used by the wearable device 100 in order to determine a physical location of the user. The physical location may be beneficial, for example, in evaluating whether one or more of the smart plurality of sensors 135 should be activated or deactivated. The data obtained from the GPS element 130 may be stored in memory 145 of the wearable device 100.

The wearable device 100 may include a plurality of sensors 135. The sensors 135 may be included to measure different parameters (e.g., biometric parameters). For example, the plurality of sensors 135 may be included to measure blood pressure, heart rate, and body temperature of the user. Sensors may also be included to monitor and record sensor data related to a current activity being performed by the user. It should be noted that other types of sensors for measuring the users biometric parameters or parameters of surrounding environmental conditions are also possible and would be within the teachings of the present disclosure.

The processor 140 of the wearable device 100 may be any computer processor known in the art. The processor 140 can be used to carry out the various instructions of the wearable device 100 (e.g., analysis of sensor data, calculations). In some embodiments, the wearable device 100 may include two or more processors.

The memory 145 of the wearable device 100, which may be a solid-state memory storage component, may be used to store data associated with the wearable device 100. The memory 145 also includes a variety of different elements (e.g., software and databases) for carrying out the functionality of the wearable device 100. As illustrated in FIG. 1, the memory 145 may include base software 150, settings software 155, power management software 160, analysis software 165, settings graphical user interface (GUI) 170, power management GUI, a settings database 180, a sensor profile database 185 and a wearable database 190. Further details regarding the various elements included in the memory 145 of the wearable device 100 are provided below.

The base software 150 of the wearable device 100 can be used to manage and operate the various other software and functions of the wearable device 100. In an embodiment, the wearable base software 100 may poll for sensor data from the plurality of sensors 135. The base software 150 may also execute software and other elements within the wearable device 100 to carry out the functionality of the wearable device 100. For example, the base software 150 may execute software to analyze power consumption from the plurality of sensors 135. The base software 150 may also execute software to manage an overall power consumption from the plurality of sensors 135 by turning on or off the sensors based on need. Further discussion of the base software 150 can be seen below with respect to FIG. 7.

The settings software 155 allows the user to input settings into a GUI. The GUI is displayed on the display 120 of the wearable device 100. Using the GUI, the user can input various parameters used to manage the operation of the plurality of sensors 135 on the wearable device 100. The parameters can then be stored in the settings data base 170. Further discussion of the settings software 155 can be seen below with respect to FIG. 4 and FIG. 8.

The power management software 160 manages the various components (e.g., plurality of sensors 135) of the wearable device 100 that consume power. The power management software 160 may manage power consumption based on settings provided by the user. The settings may be inputted into a GUI displayed on the wearable device 100. As described above, the settings software 155 can be used to obtain these settings from the user and provide the settings to the power management software 160 for use. The settings software 155 may also obtain the settings stored in the settings database 180 and provide the settings to the power management software 160 for use. Further discussion of the power management software 160 can be seen below with respect to FIG. 9.

The analysis software 165 is used to analyze the power consumption of various components (e.g., plurality of sensors 135) of the wearable device 100. The output of the analysis software 165, inclusive of any derived power consumption data about the various components of the wearable device 100, can then be provided to the user. For example, the information may be displayed on the display 120 of the wearable device 100. Further discussion of the analysis software 165 can be seen below with respect to FIG. 10.

The memory 145 of the wearable device 100 may include a variety of different databases 180-190 used to store data relevant for the functionality of the wearable device 100. As noted above, the settings database 180 may be used to store settings obtained from the user used to customize the operation and functionality of the wearable device 100.

The sensory profile database 185 may be used to store information regarding particular parameters related to power consumption of each of the sensors 135 associated with the wearable device 100. These parameters may be obtained from the user using the settings GUI, as described above and seen in FIG. 4. The information stored in the sensor profile database 185 can then be used to provide a sensor profile for each of the sensors 135 of the wearable device 100. The sensor profile can, for example, summarize the power consumption for a particular sensor and define conditions when a particular sensor is activated or deactivated.

The wearable database 190 may be used to store any other data that is usable by the wearable device 100. For example, the wearable database 190 may store the raw sensor data obtained from the plurality of sensors 135.

In this specification, the term "database" will be used broadly to refer to any electronic collection of data. The data of the database does not need to be structured in any particular way, or structured at all, and it can be stored on storage devices in one or more locations. Thus, for example, the sensor profile database may include multiple collections of data, each of which may be organized and accessed differently. Also, in this specification, the term "entry" or similar term where an element or setting is stored in a database will be used broadly to refer to any mapping of a plurality of associated information items. A single entry need not be present in a single storage device and may include pointers or other indications of information items that may be present in unique segments of a storage device and/or on other storage devices. For example, an entry that identifies a patient identifier and patient data for the patient identifier in sensor profile database may include multiple nodes mapped to one another, with one or more nodes including a pointer to another information item that may be present in another data structure and/or another storage medium.

Figure 2:
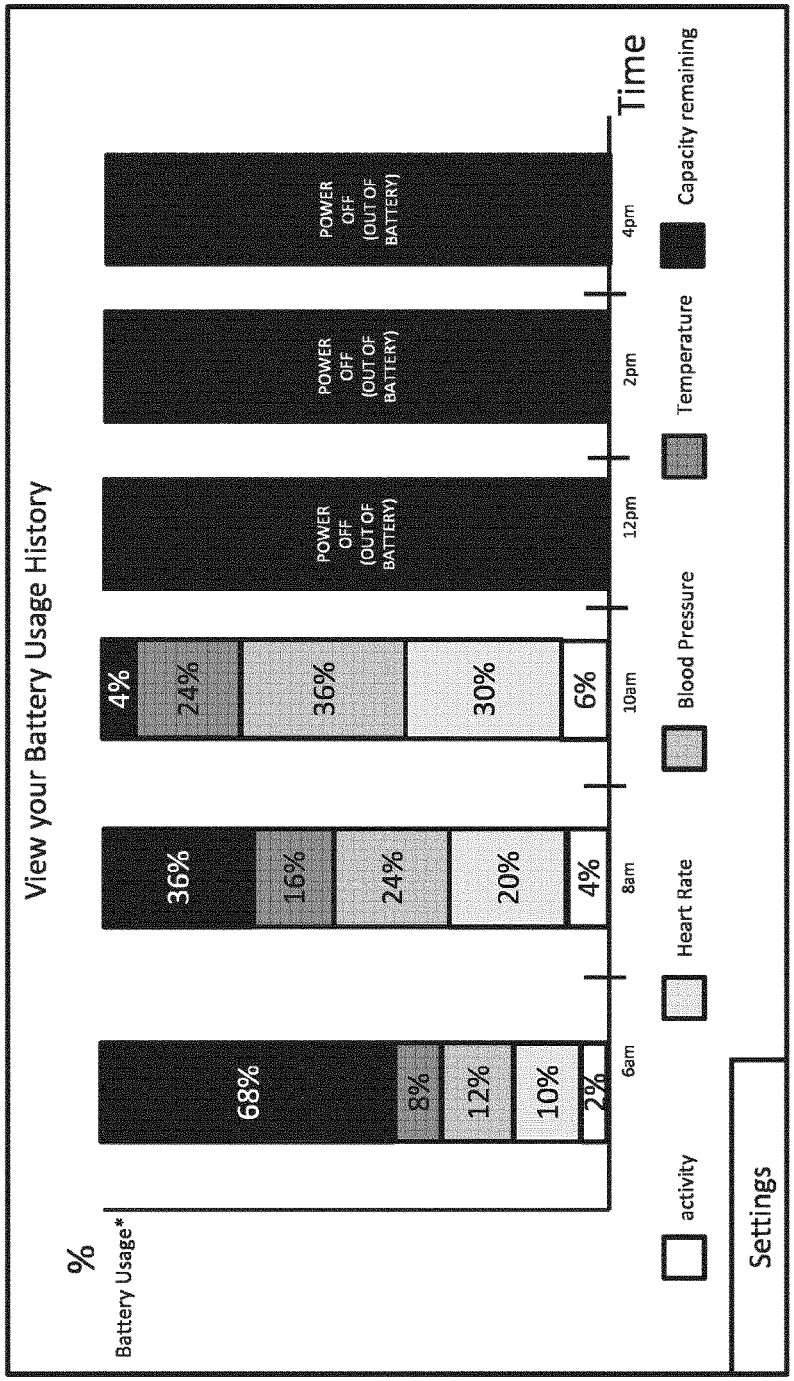
FIG. 2 illustrates an example electronic display for power management GUI on the wearable device with the power management software disabled.

FIG. 2 illustrates a power management GUI on the wearable device with the power management software disabled. In this example, the power consumption for each of the sensors associated with the wearable device not controlled. The information illustrated in the example GUI may be the type of information shown to the user on the display of the wearable device.

The power management GUI provides different types of information for the user to digest pertaining to the power consumed associated with the wearable device. The power consumed by a particular sensor, as illustrated in the figure, can be indicated using a different color. The remaining available power supply capacity can also be illustrated as well. The vertical axis may be used to represent a percentage of power consumption associated with a particular sensor. It should be noted that the summation of power consumption from the plurality of sensors and the remaining power available should add to 100%. The horizontal axis, on the other hand, may be used to represent the corresponding time when power consumption measurements were made (e.g., 6 am, 8 am, 10 am). The power management GUI can also provide information pertaining to when the wearable device is inactive. For example, the wearable device may be turned off because the wearable device is no longer in use or has exhausted the available power supply to run the wearable device.

In FIG. 2, the power management GUI illustrates that each of the sensors (e.g., activity, heart, blood pressure and temperature) may be sensors that are constantly on. More specifically, the wearable device may instruct these sensors to continually poll for sensor data. Because these sensors are constantly on, the sensors will continually consume power. Since the available power supply for the wearable device is finite, (e.g., a rechargeable lithium battery), the wearable device may not have a large enough power supply to support the power consumption of the plurality of sensors for an extended period of time. In some cases, the wearable device may run out of power and be forced to shut down (e.g., 12 pm-4 pm).

The power management GUI, as illustrated in FIG. 2, may also include a "settings" button. The "settings" button allows the user to initiate the settings GUI (see FIG. 4). The settings GUI, as described below, can be used to input parameters aimed at managing the power consumption of each of the plurality of sensors associated with the wearable device.

Figure 3:
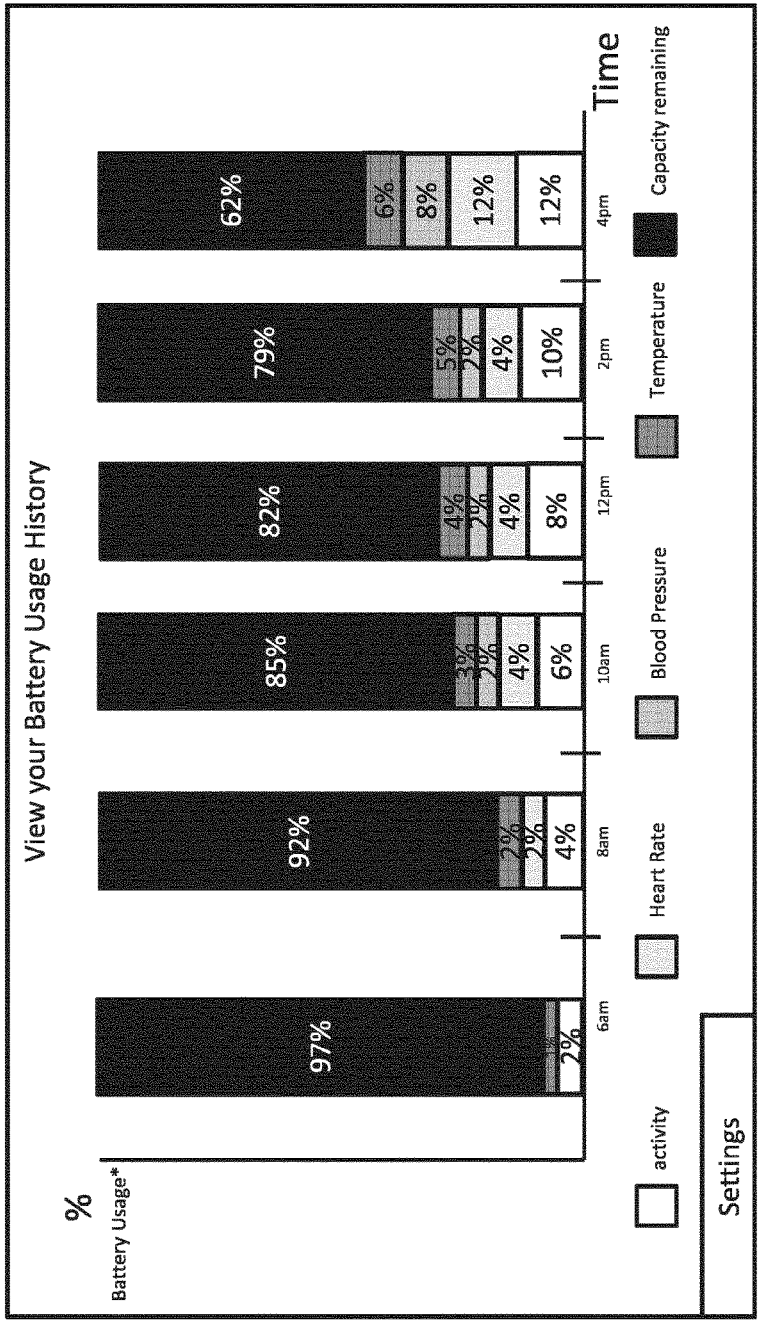
FIG. 3 illustrates an example electronic display for power management GUI on the wearable device with the power management software enabled.

FIG. 3 illustrates a power management GUI on the wearable device with the power management software enabled. Similar to FIG. 2, the power management GUI of FIG. 3 shows the power consumption of each of the sensors associated with the wearable device controlled by the power management software. The information illustrated in the example GUI may be information shown to the user on the display of the wearable device.

Using a similar layout illustrating a power consumption for each of the sensors associated with the wearable device and remaining power available as used in FIG. 2, this embodiment where the power management software is enabled shows a general overview that the power consumption of all the sensors has been reduced. For example, the reduction in overall consumption can be implemented by only turning on some sensors when they are needed. With reference to FIG. 3, only the activity and blood pressure sensors were active at 6 am. The other sensors (e.g., heart rate and temperature sensor) were deactivated.

Although FIG. 3 is an exemplary illustration, the operation of the sensors may be managed at any time throughout the day. More specifically, sensors can be activated or deactivated based on need. There may be portions of the day where the user may be inactive. In these situations, there may not be a reason to monitor or obtain sensor data (e.g., heart rate, blood pressure) as these conditions of inactivity may not be generally useful in evaluating the user health condition. In previous situations, all the sensors on the wearable device may constantly be monitoring and obtaining these trivial sensor data. The constant operations of the sensors continually consume the power supply of the wearable device. Instead, the sensors may be activated or deactivated (or alternatively be placed on a low-power state or "sleep" mode) based on the need of the sensor to obtain sensor data. The managing of operation for the plurality of sensors conserves the power supply of the wearable device.

It should be noted that some sensors associated with the wearable device may consume a consistent, yet, low amount of power if kept on throughout a period of time. There may be situations where these types of sensors may actually consume more power over the same period of time if they are constantly activated or deactivated. In other words, these sensors may consume more power initializing and configuring itself to obtain sensor data than if the sensor was left on throughout the same period of time. The power management software is capable of detecting these characteristics for these specific sensors. The software can then determine how to manage these sensors as well.

FIG. 4 illustrates a settings GUI. The settings GUI may include a variety of different settings that allows a user to customize operation of the power management software. In particular, the settings may dictate how the power management software manages how much power the sensor can consume. The power management software may also determine under what condition (e.g., time-based or data-based) the sensors may be activated or deactivated.

As illustrated in FIG. 4, the settings GUI may include a list of the available sensors associated with the wearable device. Associated with the list of available sensors are corresponding profile data for each sensor. The profile data may show the amount of battery power consumed by that particular sensor for a particular period of time (e.g., hourly).

As noted above, each of the sensors can be activated and deactivated based on a variety of different conditions. In some embodiments, the sensors may be activated based on time. For example, a sensor may be instructed to be active for set periods of time (e.g., 6 am-10 pm). Other sensors may be instructed to make a measurement at regular intervals (e.g., sample every hour).

In another embodiment, sensors can also be activated and deactivated based on a type of data. For example, sensor data obtained from one sensor may correspond with sensor data obtained by another sensor. For example, as illustrated in FIG. 4, the heart rate sensor may be activated when the activity sensor obtains sensor data that has increased over 20% over some period of time. In another situation, the blood pressure sensor may be activated whenever the heart rate sensor obtains sensor data measuring the heart rate of the user greater than 130 beats per minute.

Various triggering rules of turning one sensor on based on the measurements of a second sensor may be implemented. For example a random heart rate sampling during the day to monitor stress levels could trigger alternative sensor activity. Similarly, a fixed heart rate sampling on a fixed moment of the day may be utilized to measure a wearer's resting heart rate (RHR). The heart rate sampling for RHR may also be accomplished at opportune moments based on activity tracking results, e.g. when activity measurement detects period of sitting/lying down. Alternatively, in some embodiments, heart rate sampling may be done for stress measurement at opportune moments, e.g. change points as described in various lifestyle modeling methodologies. Each implementation noted may provide the basis upon which sensor data may be utilized to trigger activation of alternative sensor activation and/or data collection.

In the situation where the sensors are activated and deactivated based on a type of data, sensor data from one sensor may be associated with relevant sensor data from other sensors that the user may be interested in measuring. For these situations, relevant sensor data from other sensors can be instructed to initiate obtaining sensor data based. In this way, one or more sensors can be activated and deactivated based on situations where relevant data may or may not be likely present. By managing the amount of time one or more sensors are activated, a reduction in an amount of downtime for the same sensor where the sensor may be active and constantly polling but not obtaining useful sensor data. The management of sensors can also reduce the amount of power that the same sensor would consume over a period of time since the sensor would be active only for times where relevant data may be present.

It should be noted that there may be other possible conditions that trigger when one or more sensors are activated or deactivated. For example, if the wearable device uses GPS, the wearable device may utilize a location of the user to determine whether a sensor is turned on. In one instance, if a condition indicates that certain sensors should be turned on when the user is at the gym, the wearable device may utilize such condition to evaluate the location of the user and known gym locations. The evaluation of the location of the user can be used to determine if the sensors should be turned on.

The wearable device may also be capable of recognizing gestures from the user that can be set as conditions for turning on or off one or more sensors. Based on gestures (e.g., hand motions, voice commands), the user may be capable of manually activating or deactivating sensors. For example, if the user is not interested in utilizing one or more sensors, the user can provide commands to deactivate those sensors.

It may also be beneficial to have other elements of the wearable device (e.g., communication module, GPS) be managed in order to further conserve power consumption. For example, the wearable device may place various elements in a low-power (e.g., sleep) or deactivated state when one or more sensors are active.

The various settings provided by the user through the Settings GUI may be saved into the settings database. The process to save the settings data may be initiated through interaction with the "save settings" button found in the Settings GUI. It should be noted that these settings for the sensors may be updated through future "saves." In other embodiments, the user may be able to create various different types of settings that are saved in the settings database. The different types of settings may include sensor settings that are customized for a particular functionality or purpose.

Figure 5:
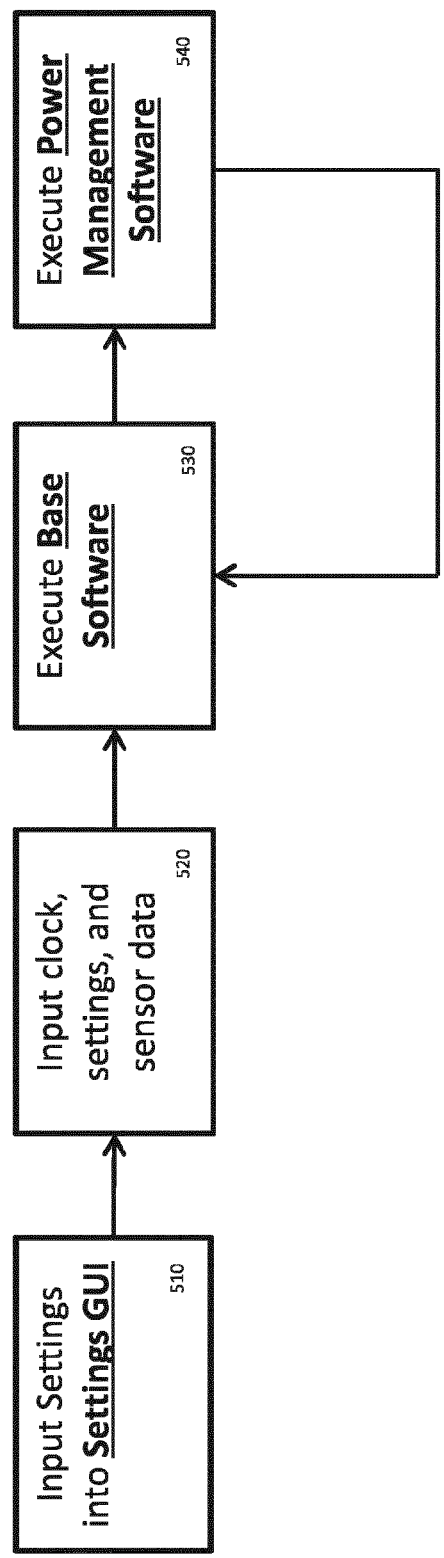
FIG. 5 illustrates an example chart and dataflow of the wearable device.

FIG. 5 illustrates a dataflow 500 of the wearable device. More specifically, the dataflow 500 illustrates steps for a user to input settings using the settings GUI.

In step 510, the user can initialize the settings GUI. As described above in FIG. 2, the user may initialize the settings GUI by selecting the option from the display of the wearable device (e.g., the Settings button on the power management GUI).

In step 520, the user can input a variety of different settings using the settings GUI. These settings may include inputting the clock data, inputting settings for managing the operation of the sensors and/or sensor data. As indicated above, sensor data may be usable in evaluating when sensors can be activated or deactivated for condition based settings.

In step 530, the wearable device can then initiate the base software. The base software can carry out the functionality of the wearable device by initiating the various software and processes. For example, the base software can provide instructions for the wearable device to obtain sensor data from any active sensors associated with the wearable device.

In step 540, the power management software can then be initiated. The power management software manages the plurality of sensors associated with the wearable device by evaluating which sensors should be activated or deactivated based on the inputted settings. After the power management software evaluates all the available sensors of the wearable device, the base software can continue to take any new sensor data from activated sensors.

Figure 6:
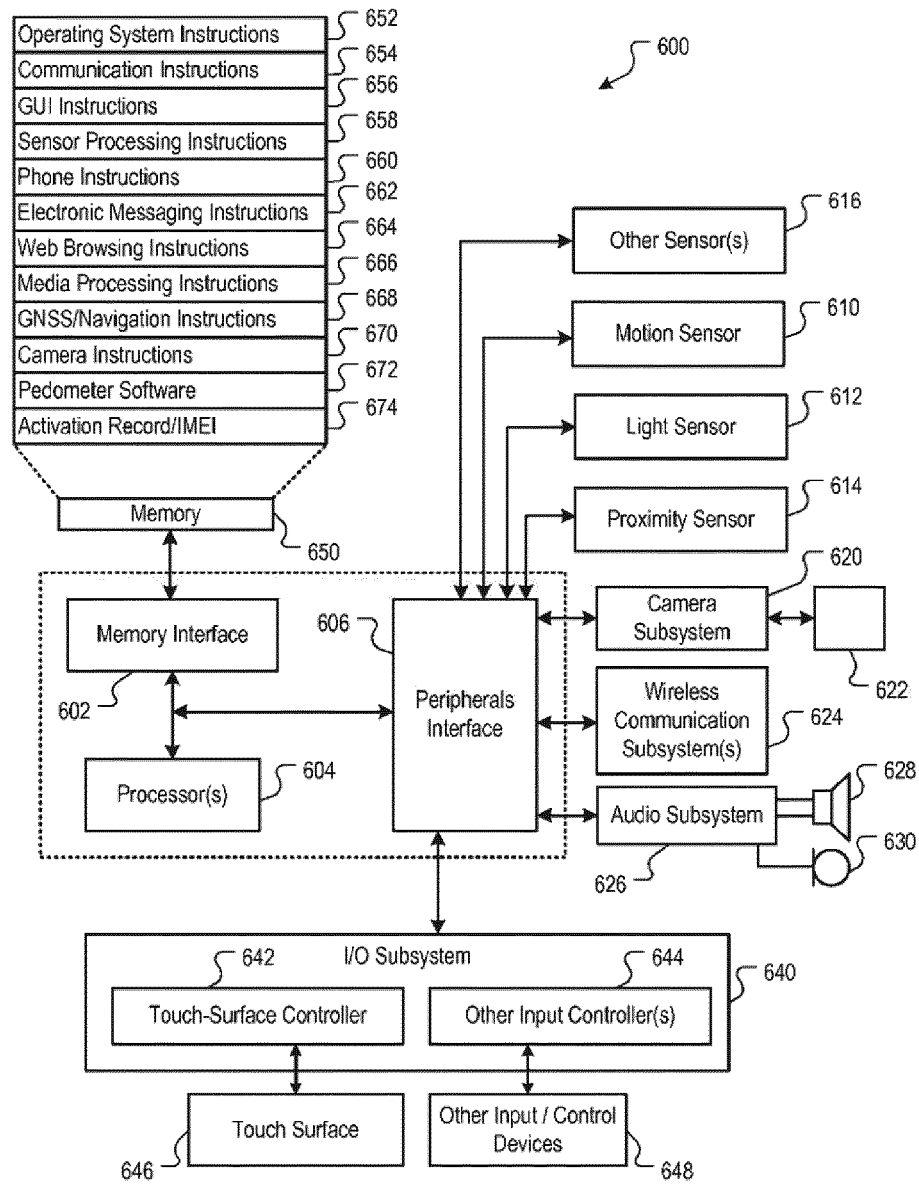
FIG. 6 illustrates an example architecture for a computing device architecture implementing the smart plurality of sensors for power management.

FIG. 6 illustrates a computing device architecture. For example, the computing device architecture 600 could be implemented in a pedometer. Architecture 600 as illustrated in FIG. 6 includes memory interface 602, processors 604, and peripheral interface 606. Memory interface 602, processors 604 and peripherals interface 606 can be separate components or can be integrated as a part of one or more integrated circuits. The various components can be coupled by one or more communication buses or signal lines.

Processors 604 as illustrated in FIG. 6 is meant to be inclusive of data processors, image processors, central processing unit, or any variety of multi-core processing devices. Any variety of sensors, external devices, and external subsystems can be coupled to peripherals interface 606 to facilitate any number of functionalities within the architecture 600 of the exemplar mobile device. For example, motion sensor 610, light sensor 612, and proximity sensor 614 can be coupled to peripherals interface 606 to facilitate orientation, lighting, and proximity functions of the mobile device. For example, light sensor 612 could be utilized to facilitate adjusting the brightness of touch surface 646. Motion sensor 610, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 606, such as a temperature sensor, a biometric sensor, or other sensing device to facilitate corresponding functionalities. Location processor 615 (e.g., a global positioning transceiver) can be coupled to peripherals interface 606 to allow for generation of geo-location data thereby facilitating geo-positioning. An electronic magnetometer 616 such as an integrated circuit chip could in turn be connected to peripherals interface 606 to provide data related to the direction of true magnetic North whereby the mobile device could enjoy compass or directional functionality. Camera subsystem 620 and an optical sensor 622 such as a charged coupled device (CCD) or a complementary metal-oxide semiconductor (CMOS) optical sensor can facilitate camera functions such as recording photographs and video clips.

Communication functionality can be facilitated through one or more communication subsystems 624, which may include one or more wireless communication subsystems. Wireless communication subsystems 624 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 624 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 624 may include hosting protocols such that the device may be configured as a base station for other wireless devices. Communication subsystems can also allow the device to synchronize with a host device using one or more protocols such as TCP/IP, HTTP, or UDP.

Audio subsystem 626 can be coupled to a speaker 628 and one or more microphones 630 to facilitate voice-enabled functions. These functions might include voice recognition, voice replication, or digital recording. Audio subsystem 626 in conjunction may also encompass traditional telephony functions.

I/O subsystem 640 may include touch controller 642 and/or other input controller(s) 644. Touch controller 642 can be coupled to a touch surface 646. Touch surface 646 and touch controller 642 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 646 may likewise be utilized. In one implementation, touch surface 646 can display virtual or soft buttons and a virtual keyboard, which can be used as an input/output device by the user.

Other input controllers 644 can be coupled to other input/control devices 648 such as one or more buttons, rocker switches, thumb-wheels, infrared ports, USB ports, and/or a pointer device such as a stylus. The one or more buttons (not shown) can include an up/down button for volume control of speaker 628 and/or microphone 630. In some implementations, device 600 can include the functionality of an audio and/or video playback or recording device and may include a pin connector for tethering to other devices.

Memory interface 602 can be coupled to memory 650. Memory 650 can include high-speed random access memory or non-volatile memory such as magnetic disk storage devices, optical storage devices, or flash memory. Memory 650 can store operating system 652, such as Darwin, RTXC, LINUX, UNIX, OS X, ANDROID, WINDOWS, or an embedded operating system such as VxWorks. Operating system 652 may include instructions for handling basic system services and for performing hardware dependent tasks. In some implementations, operating system 652 can include a kernel.

Memory 650 may also store communication instructions 654 to facilitate communicating with other mobile computing devices or servers. Communication instructions 654 can also be used to select an operational mode or communication medium for use by the device based on a geographic location, which could be obtained by the GPS/Navigation instructions 668. Memory 650 may include graphical user interface instructions 656 to facilitate graphic user interface processing such as the generation of an interface; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes, camera instructions 670 to facilitate camera-related processes and functions; and instructions 672 for any other application that may be operating on or in conjunction with the mobile computing device. Memory 650 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 650 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

Figure 7:
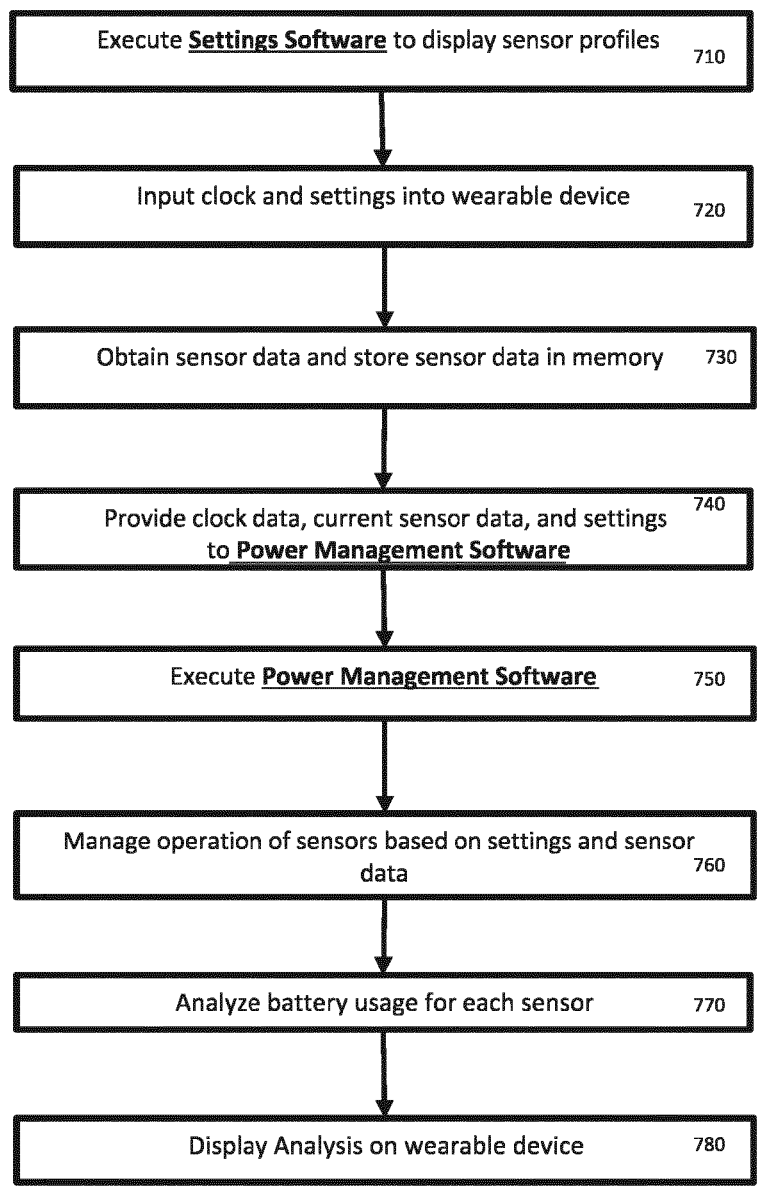
FIG. 7 illustrates an example flow chart and method for the base software.

FIG. 7 illustrates a method for the base software. As indicated above, the base software manages and operates the various functionalities of the wearable device (e.g., software).

In step 710, the base software initiates the settings software. The settings software can display the various profiles for each of the sensors associated with the wearable device. The sensor profiles may be stored in the sensor profile database. The user may view these sensor profiles in the settings GUI displayed on the display of the wearable device.

In step 720, the base software can take as input the clock and settings data for controlling the various sensors associated with the wearable device. These sets of data may have been obtained from the user using the Settings GUI. The data can then be stored in memory.

In step 730, the base software instructs the wearable device to obtain current sensor data from the plurality of sensors that are currently active. The obtained sensor data can then be stored in memory.

In step 740, the base software can provide the clock, settings and current sensor data to the power management software. The power management software may then be executed in step 750. As noted above, the power management software can use the inputted information to manage the power consumption of the various sensors.

In step 760, each of the sensors are activated or deactivated based on the clock, settings and sensor data provided to the power management software. It should be noted that the sensors may be re-evaluated as to whether they should be currently activated or deactivated at regular intervals in time (e.g., every 5 minutes). At this point, the base software may instruct the activated sensors to obtain sensor data and store the subsequently store the obtained sensor data into memory.

In step 770, the base software can execute the analysis software. The analysis software may be used to analyze power consumption with respect to the available power supply each sensor associated with the wearable device.

In step 780, the base software can instruct the output from the analysis software to be displayed on the wearable device for the user to view. More specifically, the analysis regarding the power consumption can be provided on the power management GUI. Generally, the outputted power consumption may be a graphical representation illustrating the corresponding power consumed by each sensors. Exemplary graphical representations may be seen in FIG. 2 and FIG. 3.

Figure 8:
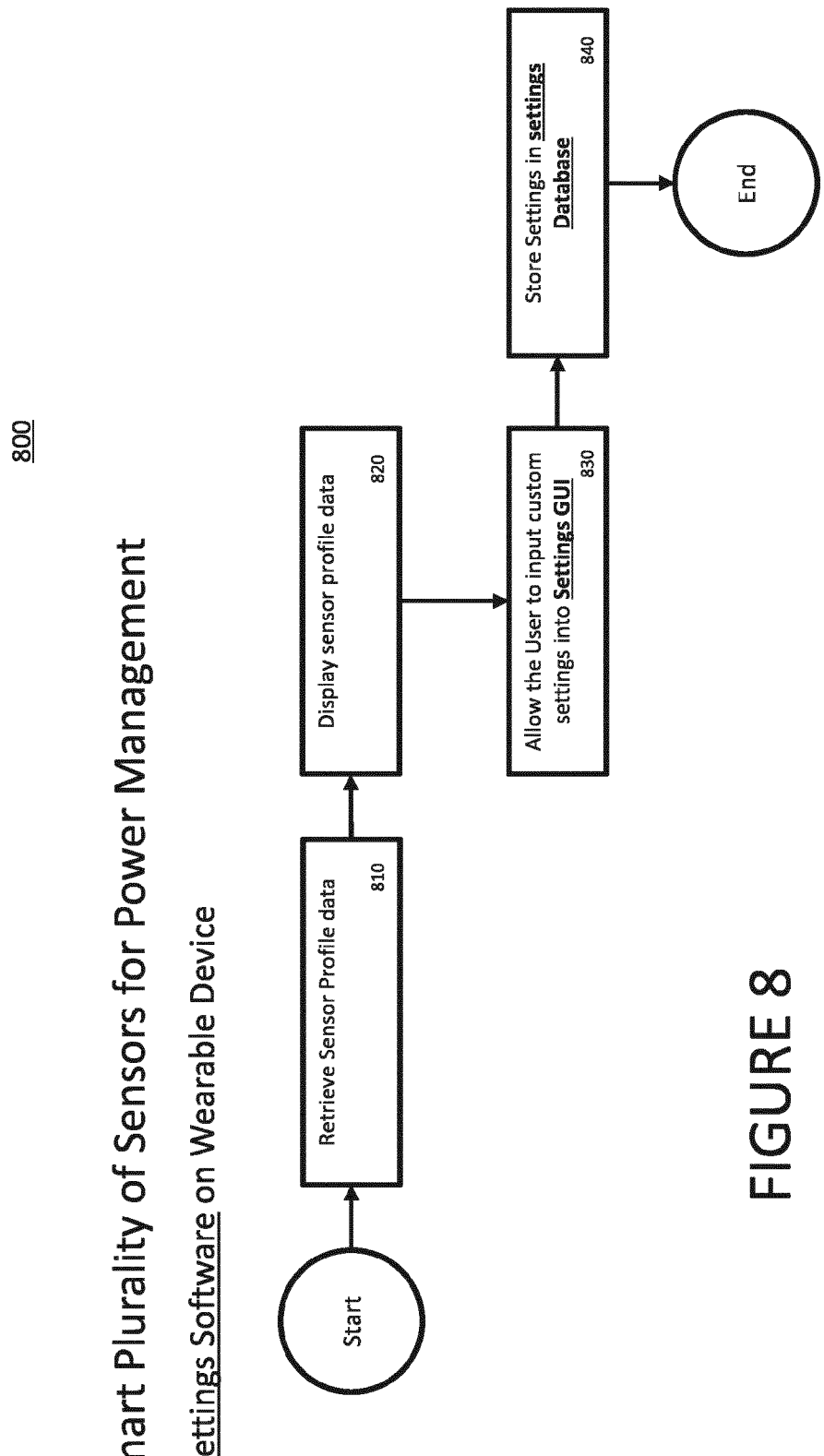
FIG. 8 illustrates an example flow chart and method for the settings software.

FIG. 8 illustrates a method 800 for the settings software. The settings software facilitates the settings GUI to input the various parameters from the user to manage the power consumption of each of the plurality of sensors associated with the wearable device. Generally, the settings software is executed by the base software in response to user input from the settings GUI.

In step 810, the settings software retrieves the sensor profiles for each of the sensors associated with the wearable device. The sensor profile data may be stored in the sensor profile database. The sensor profile data, as indicated above, may include information regarding a particular power consumed by the sensor over a period of time.

In step 820, the settings software can display the retrieved sensor profile data on the settings GUI for the user to view. An exemplary display for the sensor profile data can be seen in FIG. 4.

In step 830, the settings software obtains inputs from the user via the settings GUI. These inputs may allow the user to customize the parameters used to manage operation of the various sensors associated with the wearable device.

In step 840, the settings software stores the user inputted settings obtained via the settings GUI. In particular, the user inputted settings are stored in the settings database for future use (e.g., power management software).

Figure 9:
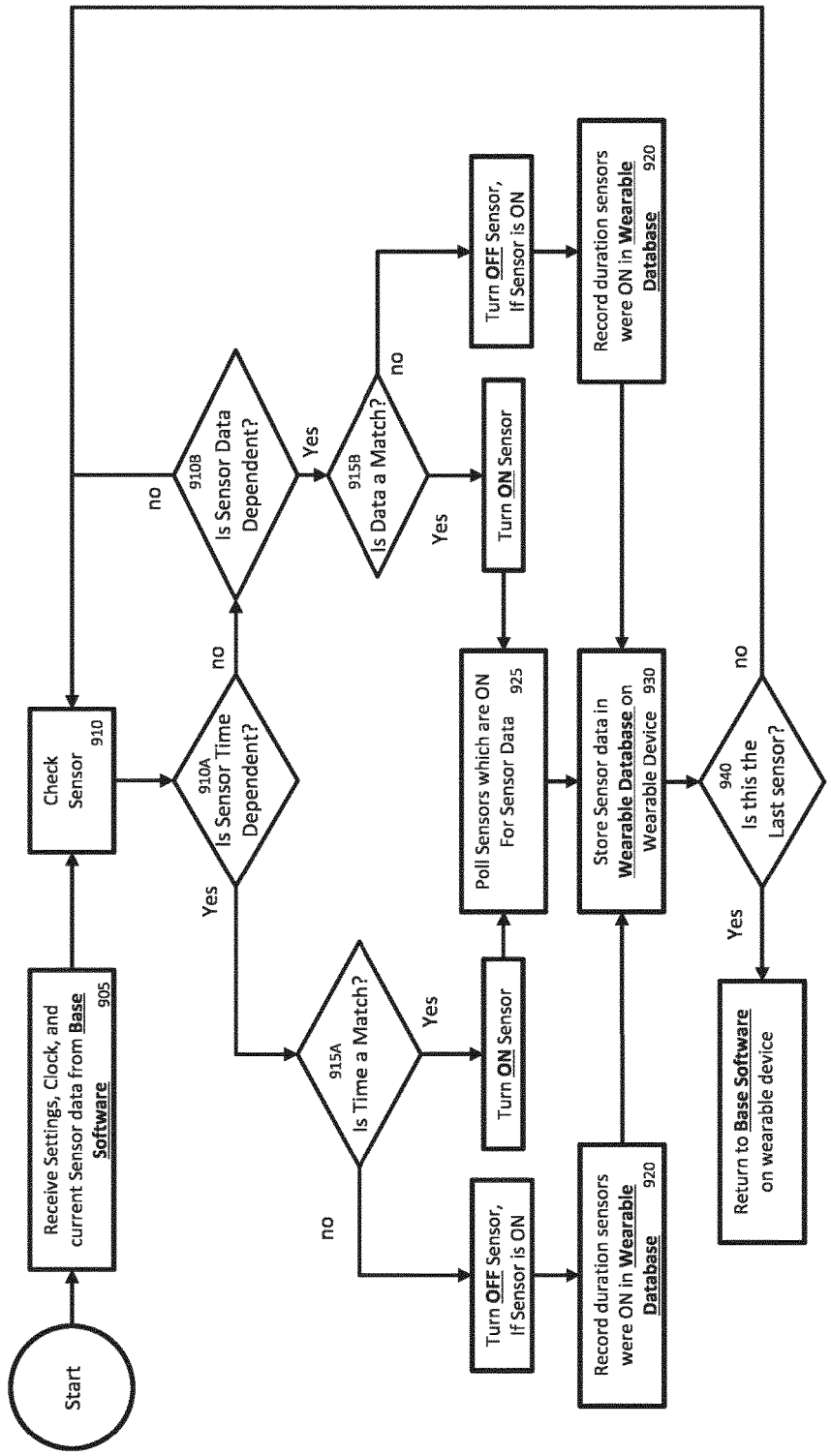
FIG. 9 illustrates an example flow chart and method for the power management software.

FIG. 9 illustrates a method 900 for the power management software. The power management software facilitates managing the power consumption of the various sensors associated with the wearable device. The base software may execute the power management software upon receipt of data used to customize the operation of the sensors (e.g., sensor data, clock data, and settings data from the settings GUI).

In step 905, the base software provides the power management software data that can be used to manage the operation of the various sensors of the wearable device. More specifically, the base software provides settings data (via the Settings GUI), clock data and sensor data.

In step 910, the power management software can perform a check for each available sensor on the wearable device. More specifically, the power management software can determine the various conditions for operating the various sensors. For example, some sensors may be dependent on time (i.e. triggered based on the clock) (see 910A). Other sensors may be dependent on the sensor data obtained from other sensors associated with the wearable device (see 910B).

In step 915 (inclusive of 915A and 915B), the power management software activates or deactivates each available sensor on the wearable device based on the checks performed in step 910. If a performed check for a particular sensor matches either a time based condition or a data based condition, the power management software may activate that sensor if the sensor is currently deactivated. Similarly, if the particular sensor provides no matches for either time based or data based condition, the sensor may be deactivated if the sensor is currently active.

In step 920, duration information about the sensors that were initially active but subsequently deactivated are obtained and recorded in the wearable database. The information about duration is later used to evaluate power consumption of that sensor over the period of time the sensor was active.

In step 925, for sensors that were activated from a deactivated state, the power management software can poll the now active sensors for sensor data. The sensor data can then be obtained from the active sensors.

In step 930, the duration information obtained in step 920 and/or the sensor data obtained in step 925 are stored in memory. More specifically, the duration information and/or the sensor data may be stored in the wearable database.

In step 940, the power management software performs a check for any other sensors associated with the wearable device that may need to be evaluated by the power management software to be activated or deactivated based on settings information. If there are at least one sensor that requires the evaluation, the method 900 repeats for each of the remaining sensors. If there all operations of the sensors have been updated by the method 900, the power management software can terminate and return operation back to the base software (step 950).

In alternative implementations or in addition to the various embodiments described herein, the power management software on the wearable device may incorporate logic to review the status of the battery before turning on any given sensor. If the battery or power storage device is below a certain threshold, the system may determine if there is another similar sensor from another device available for this user. For instance, a step counter of a smartphone may be a secondary sensor which could provide information related to movement or steps. In such a situation, the power management software may use the data from a secondary sensor for measurement of data from a disabled sensor in order to smartly preserve battery life.

Figure 9A:
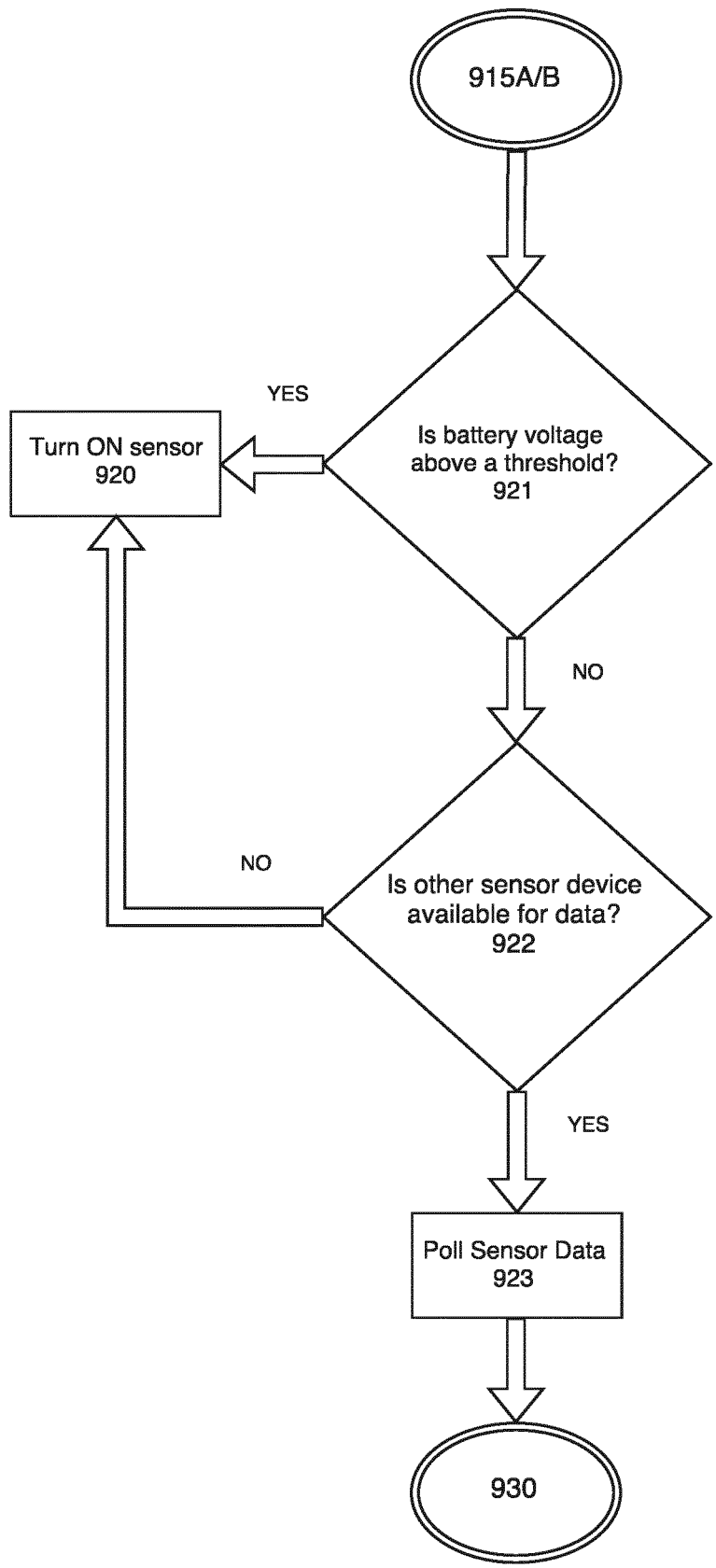
FIG. 9A illustrates an example flow chart and method for added functionality of the power management software for alternative sensor data use.

Thus, as shown in FIG. 9A, as extended from FIG. 9, if the time match or data match at step 915 A/B is determined to exist, an alternative processing step could be implemented wherein the battery voltage is determined and analyzed prior to turning on a sensor. If the battery storage voltage or other power source is sufficient and above a threshold, the sensor may be turned ON at step 920 corresponding to FIG. 9. However, if it is determined that the current voltage is such warranting conservation activity at step 921, the power management software may determine if another sensor device may be available for obtaining the data at step 922. If no alternative device sensor is available for obtaining the data, the sensor may be turned ON similarly at step 920. However, the power management system may alternatively poll the alternative device and/or sensor data at step 923 to obtain the relevant and necessary data and then return to storing the data at step 930 shown in FIG. 9.

Information related to the availability of other sensor devices to provide sensor data can be done through the settings interface or the power management software may combine with various hardware to do local polling and interrogation to determine census of locally available sensors and related data. For example, the user may be aware of sensor data available in phone sensor data and identify such availability in the settings. Alternatively, the device may incorporate close range communication protocols to interrogate nearby devices by Bluetooth, NFC or other communication exchange and protocols.

Generally, the base software may execute the power management software on a continuous loop. The method may be performed to update operation status for each sensor on the wearable device at regular intervals (e.g., 5 minutes, hourly).

As noted above, the operation status of each sensor may also be updated based on whether relevant data may be obtained for other sensors associated with the wearable device. The method 900 may include steps to activate and/or deactivate sensors based on the presence of the relevant data. Data from each of the sensors can also be stored in the wearable database.

Figure 10:
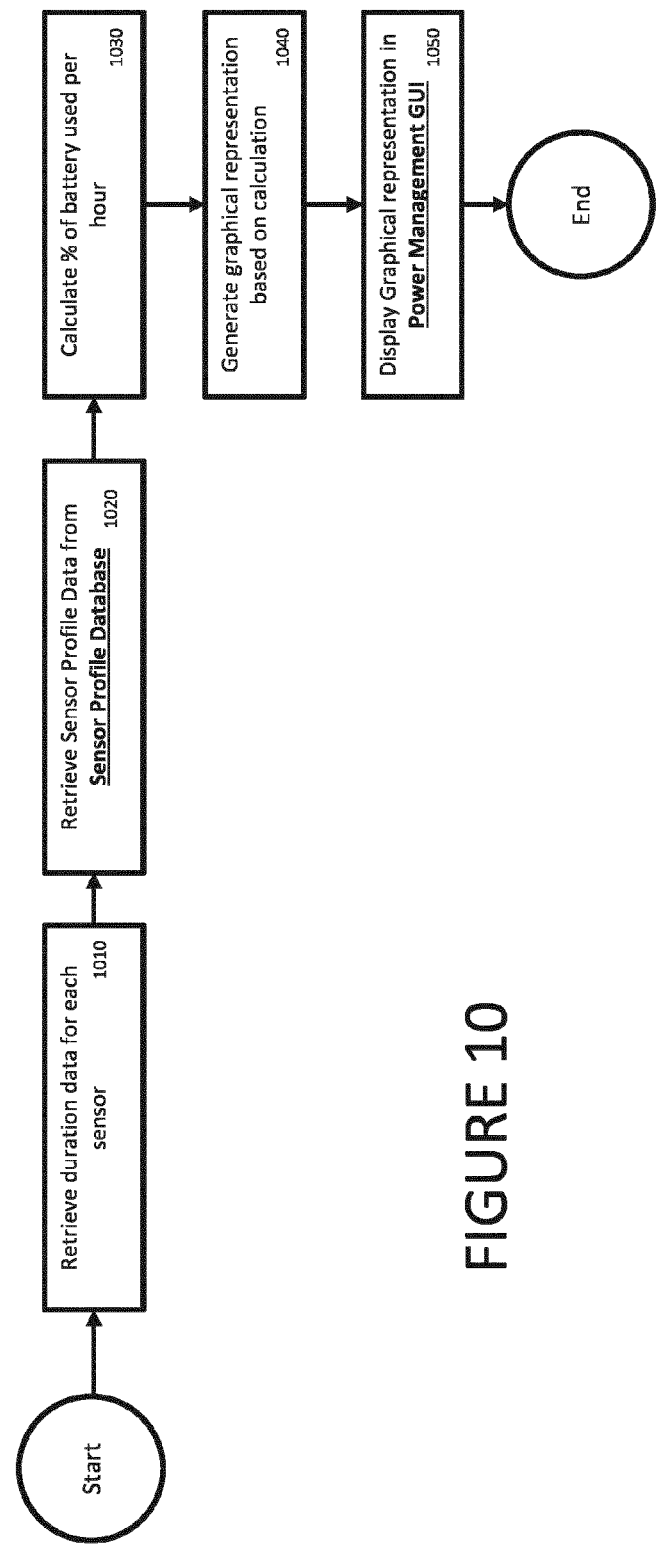
FIG. 10 illustrates an example flow chart and method for the analysis software.

FIG. 10 illustrates a method 1000 for the analysis software. The analysis software is used to calculate power consumption of each active sensor based on the duration that they were active.

In step 1010, the analysis software obtains duration information for each sensor associated with the wearable device. More specifically, duration information for each sensor may be obtained for a particular period of time (e.g., past 6-12 hours).

In step 1020, the analysis software obtains the sensor profile data for each sensor associated with the wearable device. The sensor profile data includes information such as power consumption characteristic of each sensor that can be used in conjunction with the duration information obtained in step 1010 to calculate a total power consumption for each sensor.

In step 1030, the analysis software calculates for each sensor an estimate of an amount of power consumed over a period of time. The analysis software can also calculate a remaining amount of available power on the wearable device based on the amount of power consumed by all the sensors associated with the wearable device.

In step 1040, the analysis software generates a graphical representation of the calculations obtained in step 1030. The graphical representations are then displayed, for example, on the power management GUI in step 1050. The graphical representation illustrating power consumption of each sensor and a remaining amount of power available on the wearable device may be similar to FIG. 2 and FIG. 3.

It should be noted that the analysis calculated by the analysis software may be used in other ways besides merely displaying the information for the user to view. For example, the analysis may also be used to adjust a percentage of power consumption for a particular sensor. In an embodiment, each of the sensors may be allotted a percentage of power that may be consumed from a single power supply. If a corresponding sensor percentage use of the power supply is below an allotted amount, the use of the analysis would indicate such. In response, settings for that particular sensor may be adjusted so that the sensor becomes more active in order to consume more power from the power supply.

Furthermore, the analysis may also be used to evaluate the possibility of diverting power from less used sensors to more vital sensors. The vital sensors may be necessary to provide more up-to-date sensor data for parameters (e.g., blood pressure, heart rate) that may be considered important for a functionality of the wearable device. In some embodiments where battery consumption cannot be diverted, resulting in a risk of consuming all available power pre-maturely, the wearable device may inform the user that despite possible power savings, the current state of the user may require the extended use of one or more sensors. In this way, the wearable device, through the use of the analysis generated by the analysis software, can predict the lifespan of the wearable device on the available power being supplied.

In some embodiments, the wearable device can also use the analysis to advise the user to replace or re-charge the power supply if use of the wearable device does not last a certain period of time. For example, if the user provides settings for one or more sensors to be activated to monitor and measure sensor data for a particular activity, if the current power supply may not support the wearable device during the entire duration of the activity, the wearable device can, for example, provide a recharge notification.

As noted above, the information regarding the power consumption and remaining power available on the wearable device may be useable for many different situations. There are more situations not described above that such information may be useful in implementing additional features for managing the sensors of the wearable device that are within the scope of the present disclosure.

FIG. 11 illustrates a sensor profile database. Information stored in the sensor profile database may include information about each sensor associated with the wearable device. As illustrated in the figure, exemplary sensors associated with the wearable device and stored in the sensor profile database may include sensors for measuring activity, heart rate, blood pressure, temperature, UV exposure, hydration and steps. Each sensor associated with the wearable device may have a unique product identification and model number. Also associated with each of the sensors may be a typical (or default) setting associated describing under what condition the sensor may be activated and deactivated. It should be noted that this "typical" setting may be changed by the user through the use of the settings GUI. The sensor profile database may also include an estimate of power consumption for that particular sensor.

In other embodiments, the sensor profile database may include other types of information that can be used to characterize other functionalities and properties of the sensors associated with the wearable device. The information about each sensor may be inputted by the user or may be downloaded from sources (e.g., networks) and subsequently stored in the sensor profile data. In some situations, the information about each sensor may be pre-stored into the memory of the wearable device by the manufacturer of the wearable device.

Figure 12:
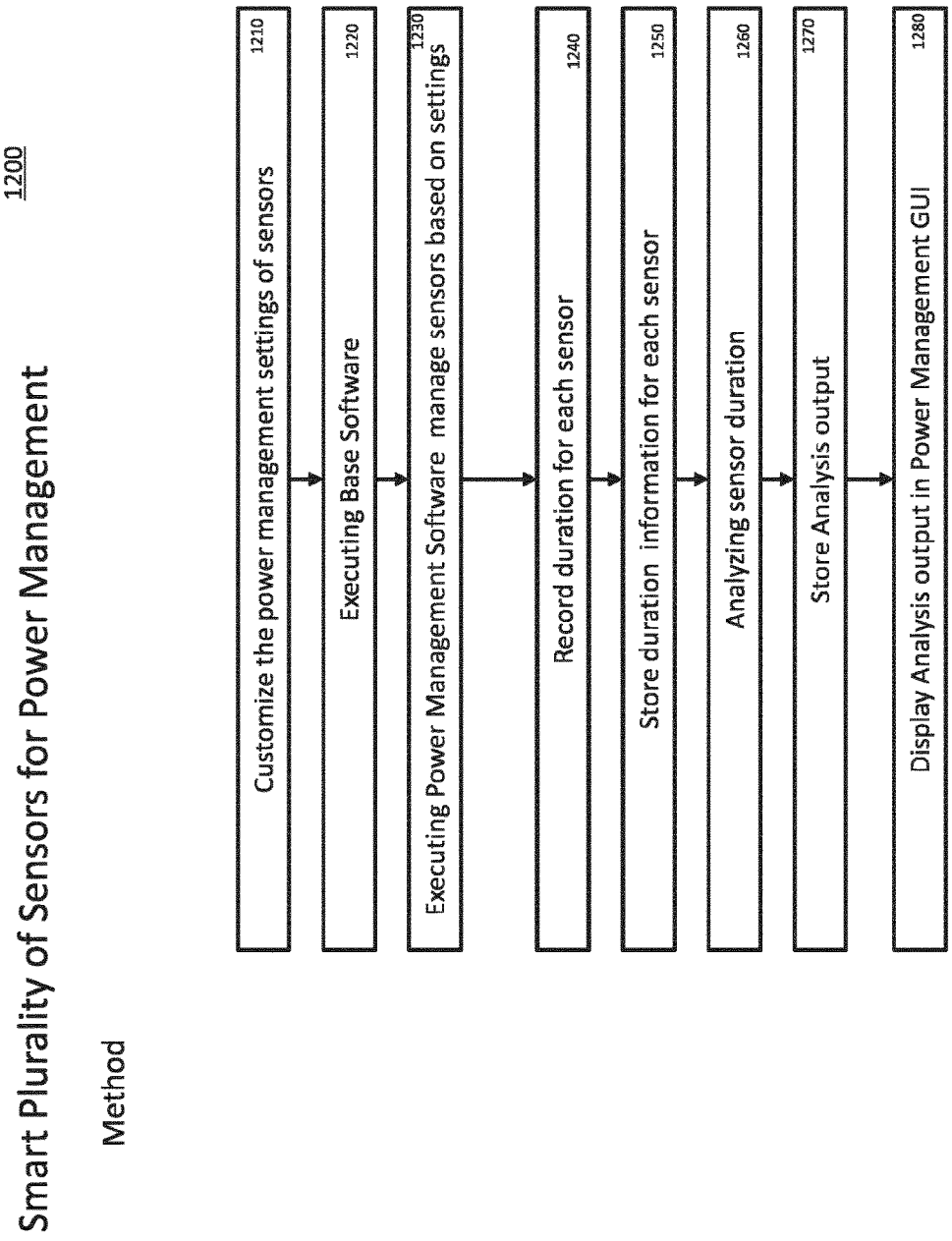
FIG. 12 illustrates an example a flow chart and method for power management using smart plurality of sensors.

FIG. 12 illustrates a method 1200 for power management using smart plurality of sensors. With the method, the sensors can be activated or deactivated based on various conditions in order to reduce the amount of power consumed by each of the sensors associated with the wearable device. In this way, the power supply for the wearable device can be extended for longer periods of time.

In step 1210, the user can input various settings used to manage the sensors associated with the wearable device. The settings, which are used to control when the sensors are activated or deactivated, may be inputted into the wearable device through the use of the Settings GUI.

In step 1220, the base software is executed. The base software, as described above, manages the different software and processes of the wearable device. The base software can be used to execute the software to obtain sensor data, obtain information from the user and store the data into memory for use later. The base software may also execute software used to manage the operation of the sensors associated with the wearable device.

In step 1230, the base software can execute the power management software. As noted above, the power management software is used to update conditions for each of the sensors associated with the wearable device. More specifically, each of the sensors are evaluated to determine if they should be activated or deactivated based on the various conditions (e.g., settings). Each sensor that has been activated may be instructed to poll for information and record any relevant sensor data into memory.

In step 1240, the duration for each sensor that was recently turned off (in step 1230) is recorded. In step 1250, the duration of each sensor is stored in the wearable device. The duration information can be used to calculate an estimate of the power consumed by that particular sensor for the period of time it was activated. It should be noted that the sensors that have been deactivated do not need to poll and record sensor data thereby minimizing overall power consumption for the wearable device.

In step 1260, the analysis software evaluates power consumption for each sensor associated with the wearable device. Generally, the analysis software utilizes the duration information obtained in step 1240 with the parameters of each sensor (e.g., sensor profile data) to generate an estimated power consumed for the period of time the sensor was active.

In step 1270, the output of the analysis software is stored in memory. The output can then be displayed for the user to view on the wearable device in step 1280. More specifically, the output from the analysis software illustrates summaries of power consumption for each sensor associated with the wearable device. The output can also include information pertaining to the amount of power remaining with the wearable device. In any case, the information may be displayed on the wearable device via the power management GUI.

Embodiments of the present disclosure also relate to an apparatus for performing the operations herein. Such a computer program is stored in a non-transitory computer readable medium. A machine-readable medium includes any mechanism for storing information in a form readable by a machine such as a computer. For example, a machine-readable and computer-readable medium includes a machine such as computer readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for power management in a wearable device comprising:
   receiving input from a user via a user interface, the user input regarding one or more power management settings to be stored in the wearable device and used to manage operation of a plurality of sensors associated with the wearable device;
   determining an updated status for each of the sensors based on the power management settings, wherein the status pertains to whether the sensor should be activated or deactivated;
   updating a state of each sensor based on the determined updated status of the sensor;
   obtaining sensor data for each activated sensor;
   obtaining a duration for each sensor that was deactivated following the updating step;
   storing the sensor data and the duration into memory;
   generating, for each sensor, an analysis of power consumption; and
   displaying the analysis on the wearable device for the user to view.

2. The method of claim 1, wherein the power management settings include time-based conditions and data-based conditions.

3. The method of claim 1, wherein the power management settings include location-based conditions, and further comprising evaluating a location of the user using a global positioning system (GPS).

4. The method of claim 1, wherein the plurality of sensors include one or more sensors including at least one of activity sensors, temperature sensors, blood pressure sensors, heart rate sensors, ultraviolet (UV) exposure sensor, hydration sensor or pedometer.

5. The method of claim 1, wherein the displayed analysis on the wearable device includes a current prediction of a life-span of the wearable device given a current amount of remaining power available.

6. The method of claim 1, wherein the updating the state of each sensor includes activating or deactivating the sensor.

7. The method of claim 1 further including before updating a state of each sensor:
   determining the power level of a power supply; and
   determining whether a secondary sensor from another device is available for polling and, if the secondary sensor is available, polling the secondary sensor.

8. A wearable device having smart plurality of sensors for power management, the wearable device comprises:
   a plurality of sensors;
   a user interface that receives input from a user regarding one or more power management settings to be stored in the wearable device and used to manage operation of the plurality of sensors;
   a processor that is configured to execute instructions stored in a memory to:
      determine an updated status for each of the sensors based on the power management settings, wherein the status pertains to whether the sensor should be activated or deactivated,
      update a state of each sensor based on the determined updated status of the sensor,
      obtain sensor data for each activated sensor,
      obtain a duration for each sensor that was deactivated following the updating step, and
      generate, for each sensor, an analysis of power consumption;
   memory that stores the sensor data and the duration; and
   a display configured to display information based on the analysis in a user-readable format.

9. The wearable device of claim 8, wherein the power management settings include at least one of time-based conditions or data-based conditions.

10. The wearable device of claim 8, wherein the power management settings include location-based conditions, and further comprising a global positioning system (GPS) configured to evaluate a location of the user.

11. The wearable device of claim 8, wherein the plurality of sensors include one or more sensors including at least one of an activity sensors, temperature sensors, blood pressure sensors, heart rate sensors, ultraviolet (UV) exposure sensor, hydration sensor or pedometer.

12. The wearable device of claim 8, wherein the displayed analysis includes a current prediction of a life-span of the wearable device given a current amount of remaining power available.

13. The wearable device of claim 8, wherein the updating the state of each sensor includes activating or deactivating the sensor.

14. The wearable device of claim 8, wherein prior to the processor updating a state of each sensor, the processor includes instructions to:
   determine the power level of a power supply; and determine whether a secondary sensor from another device is available for polling and, if the secondary sensor is available, poll the secondary sensor.

15. A non-transitory computer-readable storage medium, having embodied thereon a program executable by a processor to perform a method for power management in a wearable device comprising:

receiving input from a user via a user interface, the user input regarding one or more power management settings to be stored in the wearable device and used to manage operation of a plurality of sensors associated with the wearable device;

determining an updated status for each of the sensors based on the power management settings, wherein the status pertains to whether the sensor should be activated or deactivated;

updating a state of each sensor based on the determined updated status of the sensor;

obtaining sensor data for each activated sensor;

obtaining a duration for each sensor that was deactivated following the updating step;

storing the sensor data and the duration into memory;

generating, for each sensor, an analysis of power consumption; and displaying the analysis on the wearable device for the user to view.

* * * * *